Aug. 19, 1958 — E. B. SPELLMAN — 2,848,164
COMPUTER SLIDE RULE FOR AUTOMATIC SCREW MACHINE
Filed April 24, 1957
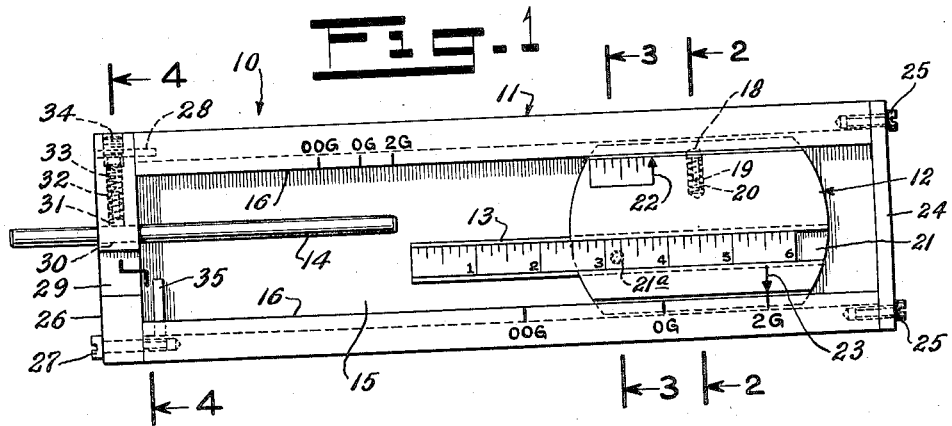
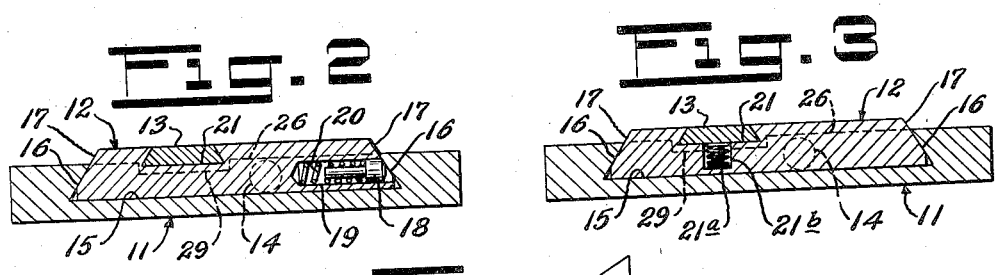
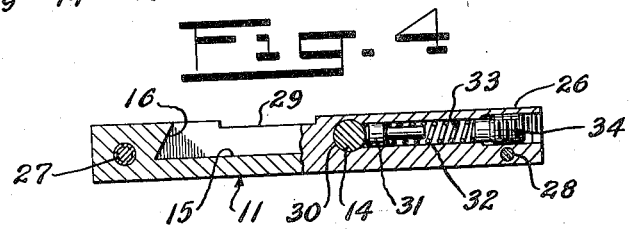
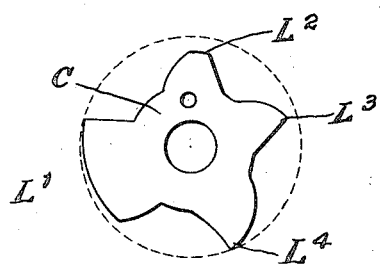
INVENTOR.
EDWARD B. SPELLMAN
BY H. G. Manning
ATTORNEY

2,848,164
COMPUTER SLIDE RULE FOR AUTOMATIC SCREW MACHINE

Edward B. Spellman, Naugatuck, Conn.

Application April 24, 1957, Serial No. 654,799

8 Claims. (Cl. 235—69)

My invention relates to slide rule computer devices, and is directed particularly to a computer for accurately determining the cam lobe heights and tool clearances for setting up automatic screw machines.

The principal object of my invention is to provide a computer device of the above nature which will eliminate guesswork and errors in the design of cams for automatic screw machines.

A more particular object of my invention is to provide a computer of the character described, which will determine the cam lobe heights for given tool lengths when setting up "Brown and Sharp" automatic screw machines of any size.

Another object is to provide a computer which may also be used to calculate the distance by which a tool will clear the end of a workpiece.

Still another object is to provide a slide rule computer of the character described, which may be used to assist in the efficient selection of pickup cams having suitable lobe heights for a given series of operating tools in the machine turret.

A further object is to provide a slide rule type computer device of the character described which will be simple in construction, inexpensive to manufacture, durable in use, and foolproof and effective in operation.

Other objects, features and advantages of my invention will be apparent from the following description when read with reference to the accompanying drawings wherein:

Fig. 1 is a top plan view of a slide rule computer embodying the invention,

Fig. 2 is a vertical cross-sectional view, taken along the line 2—2 of Fig. 1, looking in the direction of the arrows, Fig. 3 is a vertical cross-sectional view, taken along the line 3—3 of Fig. 1, in the direction of the arrows, Fig. 4 is a vertical cross-sectional view, taken along the broken line 4—4 of Fig. 1, in the direction of the arrows, and Fig. 5 is a front view of a turret cam, the lobe heights of which may be computed by the improved slide rule comprising this invention.

In the drawings, wherein like reference numerals denote corresponding parts throughout the several views, the numeral 10 designates the computer slide rule device generally, the same comprising a rectangular base 11, a turret slide member 12 slidably mounted on said base for motion in a longitudinal direction, a scale member 13 graduated in inches slidably mounted within said turret slide member 12, and a cylindrical rod 14 slidably mounted in one end of the base 11, and also movable in a longitudinal direction.

The rectangular base 11, which is preferably made of aluminum, but which also can be made of any other suitable material such as hard wood or synthetic plastic, is provided with a central longitudinal slide recess or channel 15 having inwardly beveled sides 16.

The turret slide member 12 is fitted within the channel 15 of the base 11, and has parallel beveled sides 17 complementary to the sides 16 thereof.

A transverse plunger 18, located in a side bore 19 of the turret slide member 12, and pressed outwardly by a coil spring 20, serves as a friction means for holding said turret slide member 12 in adjusted position with respect to the channel 15 (see Fig. 2).

As illustrated in Fig. 1, the ends of the turret slide member 12 may be arcuate in shape to simulate the turret which it represents. The top of the turret slide member 12 is provided near one side with a longitudinal groove 21 having inwardly beveled sides for retaining in slidingly fitted relation therein a scale 13, which has complementary beveled side edges. As best illustrated in Fig. 3 a vertical coil compression spring 21a, constrained within a vertical cylindrical recess 21b in the turret slide member 12, beneath the scale 13, serves to frictionally hold said scale in adjusted position within the turret slide member 12.

For purposes hereinbelow appearing, the turret slide member 12 is also provided along one side with a "least distance" arrow 22 to be indexed with one or another of the markings 00G, 0G, and 2G, which represent the various machine sizes of B & S automatic screw machines, along an adjacent side portion of the base 11. The turret slide member 12 is also provided along its other side with a "greatest distance" arrow 23 which is adapted to be indexed with similar markings 00G, 0G, and 2G along the adjacent side portion of said base 11.

The rear end of the base 11 is closed by a rectangular end member 24, secured to said base as by machine screws 25; while the forward end of said base 11 is closed by a somewhat thicker, generally rectangular end member 26 held in place at one side by a machine screw 27 and at the other side by a dowel pin 28.

A rectangular longitudinal slot 29 is provided in the upper surface of the end member 26 to allow passage of the outer end of the scale member 13 when the turret slide member 12 is located at the left end of the base 11.

The rod 14 is fitted within a cylindrical bore 30 in the end member 26, and is frictionally held in adjusted positions by means of a cross plunger 31 arranged in a side bore 32 extending into the bore 30 and urged against said rod by means of a coil spring 33. The coil spring 33 is held in place by an adjustable set screw 34 threaded into the end of the side bore 32 (see Fig. 4).

A thin, rectangular "cutoff" bar 35 is secured against one side of the base 11 near the forward end thereof and extends at right angles for a short distance into the channel 15 of said base.

Fig. 5 illustrates the shape of a cam C having four turret control lobes $L_1$, $L_2$, $L_3$, $L_4$, the heights of which may be computed by the slide rule embodying the invention for any one of the three commonly used sizes 00G, 0G and 2G of "Brown and Sharp" automatic screw machines.

Operation

In order to find the required cam lobe cut-down, if any, the turret slide member 12 will first be adjusted so that its "least distance arrow" 22 will point to the proper machine size designation 00G, 0G, or 2G. The rod 14 will then be pushed out to the right of the cutoff bar 35 to a distance that will represent the point of extreme forward travel of the corresponding turret tool. The scale member 13 will then be moved to the left, in the turret slide member 12 by a distance equal to the tool body length, this distance being read at the left hand arcuate edge of said turret slide member (Fig. 1). In case the scale 13 overlaps the rod 14, the amount of lobe cut-down will be then indicated by the overlap measurement of scale 13 with respect to the rod 14.

In order to find the distance by which a given tool will clear the end of a workpiece held in the screw machine, the turret slide member 12 will first be adjusted so that its "greatest distance arrow" 23 points to the proper machine size designation. The rod 14 will then be pushed to the right of the cutoff bar 35 to a distance equal to the length by which the workpiece to be machined extends from the screw machine. The amount of clearance will be then indicated by the spacing between the ends of the rod 14 and the scale 13 (see Fig. 1).

While I have described and illustrated herein a preferred embodiment of my invention, it is to be understood that this disclosure is for the purpose of illustration only and that various omissions or changes in arrangement of parts, as well as the substitution of equivalent elements can be made without departing from the spirit and scope of the invention, as defined in the following claims.

Having thus fully described the invention, what is claimed as new and for which it is desired to secure Letters Patent is:

1. A slide rule device for computing the height of cam lobes and tool clearances when setting up automatic screw machines, comprising an elongated base member having a longitudinal recess, a slide member mounted in said recess, a measuring scale member slidably mounted on said slide member, an elongated guide piece slidably mounted in one end of said elongated base member in spaced parallel relation to said measuring scale member, index means for setting said slide member in adjusted position with respect to said elongated base member in accordance with the particular machine size for which calculations are being made, and index means on said elongated member for adjusting the extension of said guide piece in accordance with the extreme forward travel of a corresponding turret tool, or in accordance with the distance by which the work piece to be machined extends from the machine, to determine, selectively, the cam lobe cut-downs or the distance by which the tool will clear the end of the workpiece.

2. The slide rule device as defined in claim 1, wherein said slide member has arcuate ends to represent an automatic screw machine turret.

3. The slide rule device as defined in claim 1, wherein said longitudinal guide recess comprises a beveled channel within which said slide member is fitted.

4. The slide rule device as defined in claim 1, wherein said measuring scale member is graduated in inches and the reading of which is made against a lateral edge of said slide member.

5. The slide rule device as defined in claim 1, including means for frictionally holding said slide member, said measuring scale member, and said guide piece in adjusted positions.

6. The slide rule device as defined in claim 5, wherein said frictional holding means comprises spring pressed plungers.

7. The slide rule device as defined in claim 1, wherein said slide member setting index means comprises sets of markings on each side of said elongated member, a "least distance" arrow on one side of said slide member indexable, selectively, with one marking of one of said sets of markings, and a "greatest distance" arrow on the other side of said arrow indexable, selectively, with one marking of the other of said sets of markings.

8. The slide rule device as defined in claim 1, wherein said extension adjusting index means comprises a cut-off bar fixed in transverse disposition with respect to said elongated member.

No references cited.